(12) United States Patent
Edelhaus

(10) Patent No.: US 8,024,436 B2
(45) Date of Patent: *Sep. 20, 2011

(54) COMMUNICATION DEVICE FOR OBTAINING AN APPLICATION IMAGE OR CONFIGURATION FROM A SERVICE PROVIDER

(75) Inventor: Shimon Edelhaus, Sharon, MA (US)

(73) Assignee: Belcan Holdings Ltd., Victoria, Mahe (SC)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,734

(22) Filed: Apr. 6, 2010

(65) Prior Publication Data

US 2010/0191841 A1 Jul. 29, 2010

Related U.S. Application Data

(63) Continuation of application No. 11/190,085, filed on Jul. 25, 2005, now Pat. No. 7,720,943.

(60) Provisional application No. 60/591,310, filed on Jul. 26, 2004.

(51) Int. Cl.
*G06F 15/177* (2006.01)

(52) U.S. Cl. ....................................................... 709/222

(58) Field of Classification Search .................. 709/222, 709/238, 246; 717/174
See application file for complete search history.

(56) References Cited

U.S. PATENT DOCUMENTS

| | | | |
|---|---|---|---|
| 5,838,907 A * | 11/1998 | Hansen | 709/220 |
| 5,974,547 A * | 10/1999 | Klimenko | 713/2 |
| 6,012,088 A * | 1/2000 | Li et al. | 709/219 |
| 6,170,061 B1 * | 1/2001 | Beser | 726/3 |
| 6,275,942 B1 * | 8/2001 | Bernhard et al. | 726/22 |
| 6,286,038 B1 * | 9/2001 | Reichmeyer et al. | 709/220 |
| 6,330,613 B1 * | 12/2001 | Vlajnic et al. | 709/234 |
| 6,457,175 B1 * | 9/2002 | Lerche | 717/173 |
| 6,748,520 B1 | 6/2004 | Maynard et al. | |
| 6,757,723 B1 * | 6/2004 | O'Toole et al. | 709/222 |
| 6,854,009 B1 * | 2/2005 | Hughes | 709/220 |

(Continued)

FOREIGN PATENT DOCUMENTS

JP 2004-178575 A 6/2004

(Continued)

OTHER PUBLICATIONS

Bahlmann, Bruce, "BOOTP, DHCP, and TFTP Implementation", Nov. 6, 1996, 12 pages, "www.birds-eye.net/technical_archive/bootp-dhcp-tftp_implementation.htm" retrieved on Aug. 10, 2009.*

(Continued)

*Primary Examiner* — Douglas B Blair
*Assistant Examiner* — Benjamin Ailes

(57) ABSTRACT

A DSL customer premises equipment modem (DCPE) avoids the requirement of a flash or other static memory for storing an application image or configuration on the modem. The modem instead stores microcode used to boot its chipset and obtain the application image and/or configuration from a remote site, such as the central office (CO). In one possible startup procedure, this microcode initializes the modem's chipset, starts the DSL driver, establishes a data link with the service provider's CO equipment, and downloads the application image and/or the configuration from the CO. Other types of communications devices, such as cellular phones or other portable devices, can perform a similar procedure to obtain an application image from a remote source, such as a base station.

25 Claims, 2 Drawing Sheets

U.S. PATENT DOCUMENTS

| | | | |
|---|---|---|---|
| 7,039,682 B2 * | 5/2006 | Baitinger et al. | 709/208 |
| 7,043,537 B1 * | 5/2006 | Pratt | 709/220 |
| 7,099,338 B1 * | 8/2006 | Lee | 370/401 |
| 7,111,054 B2 * | 9/2006 | Lo | 709/220 |
| 7,272,706 B2 | 9/2007 | Ben Ismail et al. | |
| 7,313,384 B1 * | 12/2007 | Meenan et al. | 455/410 |
| 7,313,606 B2 * | 12/2007 | Donahue et al. | 709/220 |
| 7,397,911 B2 * | 7/2008 | Shen et al. | 379/219 |
| 2002/0026504 A1 * | 2/2002 | Lo | 709/220 |
| 2006/0156140 A1 * | 7/2006 | Van Haegendoren et al. | 714/741 |
| 2008/0028051 A1 * | 1/2008 | Massam et al. | 709/221 |
| 2010/0042708 A1 * | 2/2010 | Stamler et al. | 709/221 |
| 2010/0125649 A1 * | 5/2010 | Day et al. | 709/219 |
| 2010/0268823 A1 * | 10/2010 | Torarp et al. | 709/225 |

FOREIGN PATENT DOCUMENTS

WO    WO 2004/059508 A1    7/2004

OTHER PUBLICATIONS

Hausman, Jerry A. et al., "Cable Modems and DSL: Broadband Internet Access for Residential Customers", May 2001, The American Economic Review, vol. 91, No. 2, Papers and Proceedings of the Hundred Thirteenth Annual Meeting of the American Economic Association, pp. 302-307. "www.jstor.org/stable/pdfplus/2677778.pdf" retrieved on Aug. 14, 2009.*

European Extended Search Report, European Application No. 05782562.2, Dec. 10, 2010, 6 pages.

Non-Final Office Action for Japan Patent Application No. P2007-523738, Mar. 8, 2011, 3 pages.

* cited by examiner

COMMUNICATION DEVICE FOR OBTAINING AN APPLICATION IMAGE OR CONFIGURATION FROM A SERVICE PROVIDER

CROSS REFERENCE TO RELATED APPLICATIONS

This application is a continuation of U.S. application Ser. No. 11/190,085, filed Jul. 25, 2005, now U.S. Pat. No. 7,720,943 which claims the benefit of U.S. Provisional Application No. 60/591,310, filed Jul. 26, 2004. Each of the foregoing applications is incorporated by reference in its entirety.

BACKGROUND

The present invention relates in general to customer premises equipment (CPE) communication devices, such as DSL customer premises equipment modems. The invention also relates to other types of communication devices, including cellular phones and other portable communication devices.

Upon startup of a DSL customer premises equipment (CPE) modem (DCPE), an application image is loaded and executed by the DCPE and is then used to control the operation of the DCPE. In existing DCPEs, the application image is stored in an onboard flash memory. Disadvantageously, the onboard flash memory used to store the application image is expensive, contributing to and increasing the overall cost of the DCPE. It would thus be beneficial to eliminate the need for these onboard flash memories, or their equivalent, in the manufacture of DCPEs.

DSL modems have used protocols such as BOOTP (as defined in IETF RFC-951) and TFTP (as defined in IETF RFC-783) to download the application image from the central office (CO), but only in the context of upgrading an existing application image that resides in the modem's onboard flash memory. These modems did not eliminate the requirement of having an onboard flash memory, since the modems still needed the application image to start up, initialize, and set up a data link with the CO before the new application image upgrade could be downloaded. Hence, these modems still required a flash memory, or its equivalent, and thus suffered from the drawbacks associated therewith.

Moreover, existing DCPEs are limited in their ability to add features or fix software defects by upgrading their software code. For example, adding features and/or fixing defects in the application image may result in increased application image size. The larger application image may not fit into the original onboard flash that was included when the DCPE was shipped to the customer. Therefore, storing the application image in an onboard flash memory also limits the ability to upgrade the application image itself.

Besides the additional cost and limitation on the application image size, storing the application image for the modems in an onboard flash memory makes it more difficult to push upgrades to the application from the CO. Because DCPEs often include an integrated NAT-firewall-router, the network architecture of the CPE is hidden from the services provider. This may allow the customers to deploy more LAN devices and computers than what is allowed under the customer's plan (e.g., the number of devices paid for under the agreement with the services provider). Accordingly, storing the application image in an onboard flash memory can make it more difficult to push upgrades to the application image and configuration as well as enforce data services plans.

Accordingly, it would be desirable to have a DCPE that could operate without an application image stored in an onboard flash memory, thus reducing the manufacturing cost of the modem and avoiding the inherent disadvantages involved with storing the application image onboard the DCPE.

SUMMARY OF THE INVENTION

The invention provides a DSL customer premises equipment modem, or DCPE, that obtains the application image from the CO upon startup rather than from an onboard or otherwise attached local memory. In this way, the modem does not require a flash or other static memory for storing the application image for the modem. In one embodiment, the DCPE includes a chipset that is booted using microcode contained in a memory unit (e.g., a small one-time programmable ROM). This microcode initializes the DCPE chipset, starts the DSL driver, accomplishes a reliable data link with the service provider's CO equipment, and then performs a download of the application image and the configuration from a CO provisioning server. The download may be accomplished using protocols such as BOOTP and TFTP. The downloaded application image and configuration is stored in the DCPE's RAM and is used to operate the DCPE as normal.

Unlike existing DCPEs, which store the application image and configuration in an onboard flash, embodiments of the invention eliminate the need for an onboard flash memory for storing the application image and/or configuration for the DCPE. Accordingly, embodiments of the invention allow for deployment of less expensive DCPEs due to the elimination of costly flash devices from the DCPEs' bill of materials. Obtaining the application image and configuration from the CO rather than from an onboard flash memory also allows for greater ability to add features or fix software defects via code upgrades to the application image and/or configuration. Moreover, this feature also allows a service provider to push the deployment configuration and network topology from the CO more easily, allowing the service provider to enforce service plans and prevent fraud or misuse by the customer.

Embodiments of the invention also make installation and use of DCPEs easier and more seamless for the user. Existing DCPEs are difficult to deploy and manage. Typically, a user needs to enter and save some parameters to deploy the DSL service. A misguided user may save the wrong configuration into the DCPE's onboard flash memory or try to perform a firmware upgrade that could render the DCPE inoperable. Embodiments of the invention allow the service providers to provide full configuration to the users to turn on their DSL service without any configuration required by the customer. This reduces or eliminates the danger of a bad firmware upgrade, since the service provider manages the firmware for the different types of DCPEs. In addition, costly customer support calls or truck rolls can be avoided.

DETAILED DESCRIPTION OF THE PREFERRED EMBODIMENTS

Figure 1:
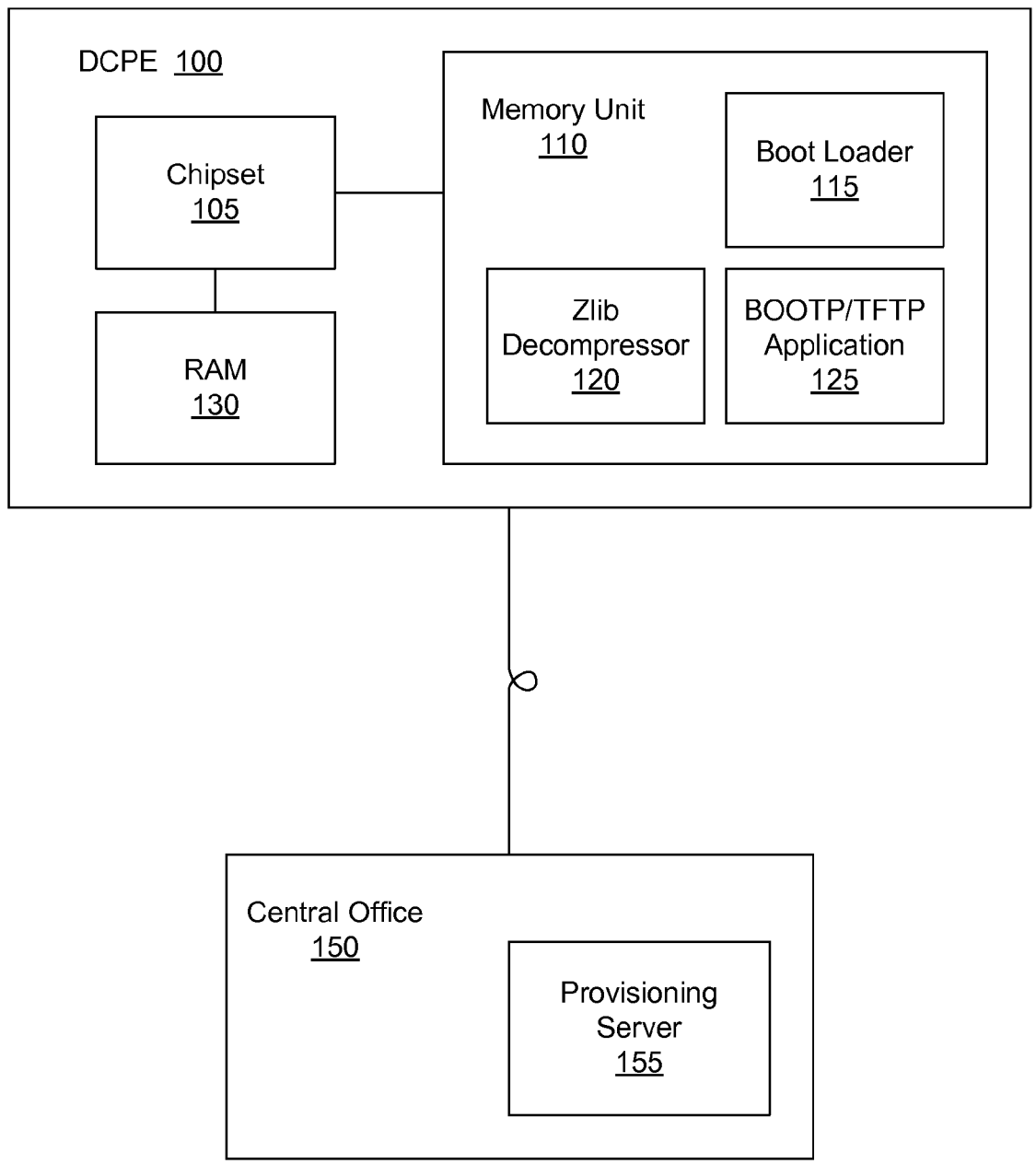
FIG. 1 is a schematic diagram of a customer premises equipment DSL modem, in accordance with an embodiment of the invention.

As illustrated in FIG. 1, a customer premises DSL modem (DCPE) 100 communicates with equipment in a central office (CO) 150 over a local loop. The local loop traditionally comprises a twisted pair of copper wires that may be used to deliver voice telephone service to the customer premises in addition to the DSL data service. Various configurations and systems for DSL and voice service are well known.

In accordance with one embodiment, the DCPE 100 comprises a chipset 105, a memory unit 110, and a RAM 130. The memory unit 110 provides a persistent storage mechanism that holds data even when the DCPE 100 is not powered on. In one embodiment, the memory unit 110 comprises a small (e.g., 128-kb) one-time programmable (OTP) ROM. The memory unit 110 may be external to the chipset 105 or fused into the chipset 105 in the form of a masked ROM. The memory unit 110 contains microcode, which the chipset 105 can execute to perform certain tasks. In the embodiment illustrated, the memory unit 110 contains a boot loader 115, a Zlib decompressor 120, and BOOTP/TFTP application 125. The memory unit 110 may also include code for performing additional functions, and the memory unit 110 need not include each of the microcode modules discussed herein.

In one embodiment, the boot loader 115 comprises executable code for initializing the chipset's RAM 130, as well as any other memory and data cache. The boot loader 115 further comprises code for performing a quick memory test and load and for using the Zlib decompressor 120 to decompress and start the compressed BOOTP/TFTP application 125. The Zlib decompressor 120 comprises executable code to allow the chipset 105 to access the memory unit 110, fetch the BOOTP/TFTP application 125, and decompress the BOOTP/TFTP application 125 into the RAM 130. Using the Zlib decompressor 120, the chipset 105 may also check the integrity of the decompressed BOOTP/TFTP application 125 against well known signatures in the header. The BOOTP/TFTP application 125 comprises a DSL driver for communicating with the CO. If the DCPE 100 is an ATM-based DCPE, the BOOTP/TFTP application 125 may include ATM and RFC-2684 drivers, or if the DCPE 100 is a PTM-based DCPE, the BOOTP/TFTP application 125 may include Ethernet and IEEE-802.3 drivers.

Figure 2:
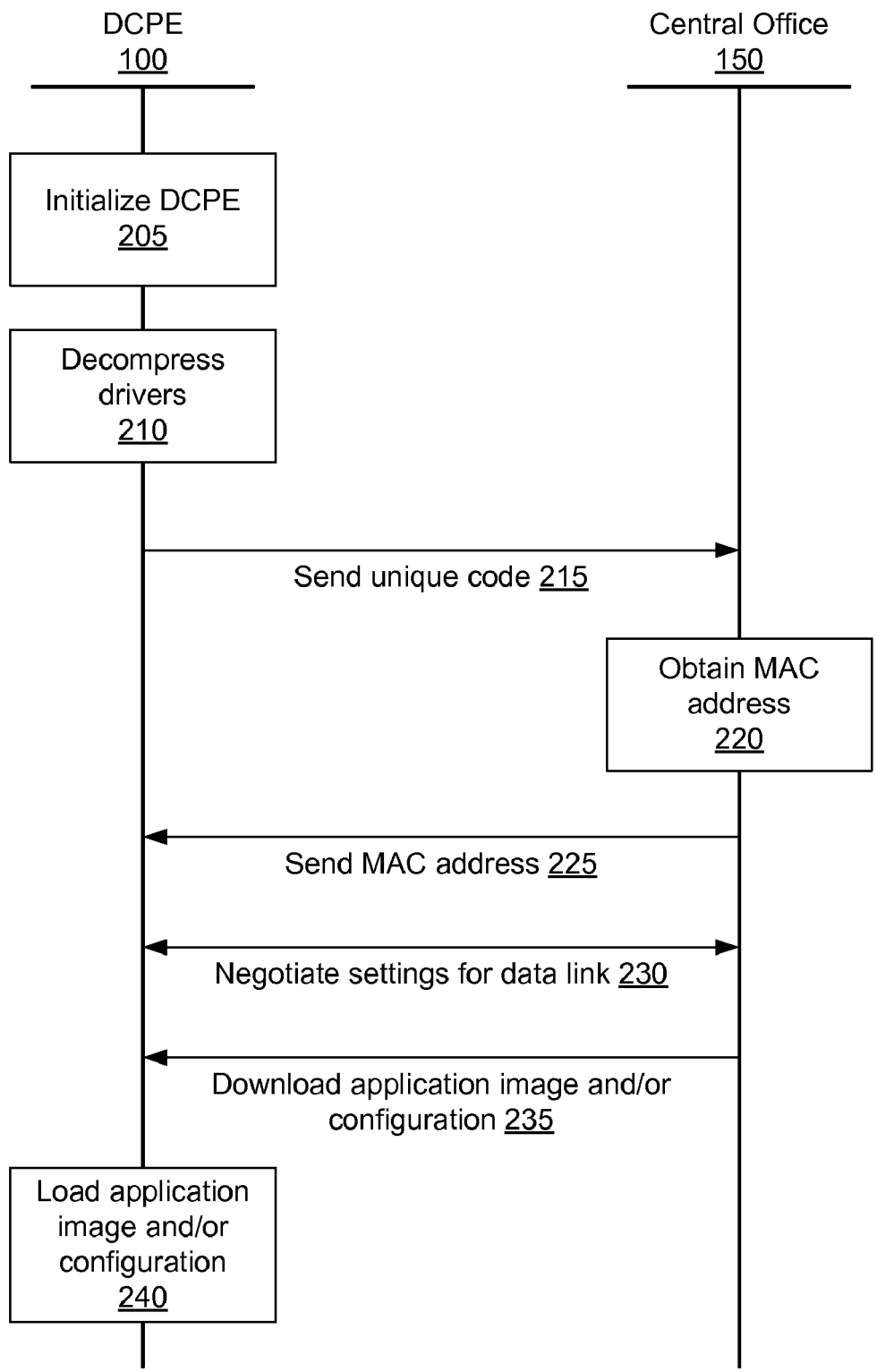
FIG. 2 is a trace interaction diagram of a startup procedure for a customer premises equipment DSL modem, in accordance with an embodiment of the invention.

FIG. 2 illustrates a startup procedure for a DCPE 100, in accordance with one embodiment of the invention. In this startup procedure, the DCPE 100 obtains an application image and/or a configuration for the modem from a CO 150. While the procedure is described in terms of the DCPE 100 illustrated in FIG. 1, it is understood that the modem may be any other type of modem that obtains an application image, configuration, or other information for normal operation of the modem from the CO 150 rather than storing that information in an onboard persistent memory.

As illustrated, the DCPE is initialized 205 upon startup, which may occur when the DCPE 100 is powered on. In one embodiment this initialization 205 is performed by the boot loader 115, described above, which initializes the modem's RAM 130 and other memory and performs a quick memory test. The DCPE 100 then decompresses 210 its DSL drivers to allow basic communication with the CO 150. This decompression 210 may be performed using a Zlib decompressor 120, described above, which decompress the BOOTP/TFTP application 125. When executed by the chipset 105, the BOOTP/TFTP application 125 starts the DSL driver and accomplishes a reliable physical link with the service provider's CO equipment 150.

During the establishment of the physical link, the DCPE 100 sends 215 a parameter to the CO 150. In one embodiment, the parameter that is sent from the DCPE 100 to the CO 150 during the establishment of the physical link (e.g., the modem training, or G.hs or G.handshake) is a unique serial number for the DCPE's chipset 105. This unique serial number can be programmed into the memory unit 110 as part of the manufacturing process, or it may be programmed into the chipset during the chipset production process in the fab if an internal masked ROM is used.

In response to receiving this unique serial number from the DCPE 100, the CO's provisioning server 155 obtains a MAC address 220 for the DCPE 100 based on a preconfigured provisioning table. In one embodiment, the provisioning server 155 running in the CO 150 includes, among other information, a table of serial numbers, the MAC addresses to assign to each serial number, the desired application image for that serial number or MAC address, and the configuration to enforce for that serial number or MAC address. The CO 150 sends 225 to the DCPE 100 a parameter to the DCPE 100 that indicates the unique MAC address that the CO 150 has allocated to it. This assures that no unauthorized DCPEs (e.g., those with improper serial numbers) are deployed in the service provider's network. Also, since the service provider determines the MAC address, the service provider can guarantee that it will be unique for each DCPE 100, thus avoiding network problems.

The DCPE 100 and the CO 150 then negotiate 230 one or more parameters, which are used as the settings for the data link layer. For ATM-based DCPEs, for example, these parameters would include the VPI/VCI and one of the following modes: LLC-Bridged, LLC-Routed, VC-Bridged, or VC-Routed. This negotiation 230 assures that the data link layer is matched on both sides, which allows for the application image and configuration to be downloaded. At this point, the BOOTP and TFTP protocols are used to perform a download 235 of the application image and/or the configuration from the CO's provisioning server 155. The application image and/or the configuration are then stored in the DCPE's RAM 130 and loaded 240 into the DCPE 100 for normal operation.

In one embodiment, the DCPE 100 sends to the CO's provisioning server 155 all updates that would otherwise be saved in the DCPE's onboard flash memory (e.g., as in a traditional DCPE). Examples of these updates include Syslog updates, Config updates, and the like.

In one embodiment, the reliable physical link is implemented according to ITU-G. 992.1, also known as G.dmt. Because most DSLAMs support G.dmt, use of this standard increases the chances of establishing a reliable physical link. In one implementation, the initial training time is about 40 seconds, and the boot up time is about 3 to 4 seconds. Accordingly, on average the implementation adds less than a minute from the moment the DCPE is powered on to the moment the user can access the Internet using the DCPE, as compared to typical DCPEs. For VDSL and other technologies where link up time is much faster, this delay is hardly noticeable.

In another embodiment, the startup scheme described herein is applied to an xDSL IP Line card in an IP DSLAM. Because it is expensive and difficult to manage flash devices on each blade in IP line cards in an IP DSLAM, it may be preferable to store the application images centrally in a control module, where a small persistent memory (such as an OTP ROM) is used on the line card to initialize the Ethernet physical and MAC and establish the Ethernet link. Using BOOTP and TFTP, the application images are then transferred to the line card's RAM, choosing the appropriate image for each appropriate line card based on card Type and card ID. In this way, configuration can also be enforced from the control module.

In yet another embodiment, the invention is applied to a cell phone, personal data assistant (PDA), or other portable device that has cellular capabilities on a G3 data enabled IP network. The application images may be stored on a provisioning server in the base stations. The portable device would include RAM and an OTP (or other small persistent memory) for the BOOTP and TFTP loader with the cellular ASIC firmware. The portable device could include a small flash for the configuration only (e.g., for the user's address book, pictures, and other data or settings). When the portable device associates with a base station and establishes wireless link, it uses BOOTP and TFTP to transfer the application image to RAM and then executes the application image to start full operation.

In this application, no implied or express disclaimer of the use of flash memory is intended. For example, embodiments of the invention may include a flash memory for purposes other than to store the application image and/or configuration. Accordingly, the foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A customer premises equipment (CPE) device comprising:
   a CPE device chipset;
   a RAM; and
   a memory unit storing microcode for execution by the CPE device chipset, the microcode comprising:
      a protocol application for communicating with a central office to obtain an application image for the CPE device, the protocol application allowing communication with the central office without using an application image, and
      a boot loader for causing the CPE device chipset to establish a data link with a central office using the protocol application, wherein the boot loader comprises Ethernet and IEEE-802.3 drivers that enable the CPE device chipset to communicate with the central office using an Ethernet protocol.

2. The CPE device of claim 1, wherein the protocol application stored in the memory is compressed, the microcode further comprising:
   a decompressor that includes code for decompressing the protocol application into the RAM.

3. The CPE device of claim 2, wherein the decompressor further includes code for checking the integrity of the decompressed protocol application.

4. The CPE device of claim 1, wherein the boot loader further includes code for initializing the RAM and for performing a memory test.

5. The CPE device of claim 1, wherein the protocol application comprises a BOOTP/TFTP application for communicating with the central office using BOOTP and TFTP protocols.

6. The CPE device of claim 1, wherein the protocol application is further configured to communicate with the central office to obtain a configuration for the CPE device.

7. The CPE device of claim 1, wherein the protocol application is configured to obtain the application image by:
   sending a unique serial number to the central office;
   receiving a MAC address from the central office; and
   negotiating with the central office to obtain one or more parameters for the data link.

8. The CPE device of claim 1, wherein the memory unit is external to the CPE device chipset.

9. The CPE device of claim 1, wherein the memory unit is fused into the CPE device chipset.

10. The CPE device of claim 1, wherein the memory unit comprises a one-time programmable ROM.

11. The CPE device of claim 1, wherein the microcode is 128 kb or less.

12. The CPE device of claim 1, wherein the CPE device does not include an onboard flash memory.

13. A customer premises equipment (CPE) device comprising:
   a CPE device chipset;
   a memory unit comprising a persistent memory that contains microcode for execution by the CPE device chipset to cause the CPE device chipset to perform the operations:
      establishing a data link between the CPE device and a central office without using an application image, wherein the data link is established via an Ethernet protocol using Ethernet and IEEE-802.3 drivers in the memory unit,
      downloading an application image from the central office to the CPE device via the established data link, and
      loading the application image into the CPE device.

14. The CPE device of claim 13, wherein establishing the data link comprises:
   sending a unique serial number to the central office;
   receiving a MAC address from the central office; and
   negotiating with the central office to obtain one or more parameters for the data link.

15. The CPE device of claim 13, wherein the persistent memory further contains microcode for execution by the CPE device chipset to cause the CPE device chipset to perform the operations:
   downloading a configuration from the central office via the established data link; and
   loading the configuration into the CPE device.

16. The CPE device of claim 13, wherein downloading the application image comprises using BOOTP and TFTP protocols to download the application image.

17. The CPE device of claim 13, wherein the memory unit is fused into the CPE device chipset.

18. The CPE device of claim 13, wherein the memory unit comprises a one-time programmable ROM.

19. A modem comprising:
   a modem chipset;
   a memory unit comprising a persistent memory that contains microcode for execution by the modem chipset to cause the modem chipset to perform the following operations:
      establishing a data link between the modem and a central office without using an application image in the modem,
      downloading an application image from the central office to the modem via the established data link, and
      loading the application image into the modem.

20. The modem of claim 19, wherein establishing the data link comprises:
   sending a unique serial number to the central office;
   receiving a MAC address from the central office; and
   negotiating with the central office to obtain one or more parameters for the data link.

21. The modem of claim 19, wherein the persistent memory further contains microcode for execution by the modem chipset to cause the modem chipset to perform the operations:

downloading a configuration from the central office via the established data link; and loading the configuration into the modem.

22. The modem of claim 19, wherein downloading the application image comprises using BOOTP and TFTP protocols to download the application image.

23. The modem of claim 19, wherein the memory unit is fused into the modem chipset.

24. The modem of claim 19, wherein the memory unit comprises a one-time programmable ROM.

25. The modem of claim 19, wherein the modem does not include an onboard flash memory.

* * * * *